United States Patent
King et al.

(10) Patent No.: US 6,254,790 B1
(45) Date of Patent: Jul. 3, 2001

(54) METHOD FOR FILTERING SUSPENDED MATERIALS FROM COOKING SUBSTANCES

(75) Inventors: James D. King; William Casey, both of Kettering, OH (US)

(73) Assignee: Henny Penny Corporation, Eaton, OH (US)

(*) Notice: Subject to any disclaimer, the term of this patent is extended or adjusted under 35 U.S.C. 154(b) by 0 days.

(21) Appl. No.: 09/295,441

(22) Filed: Apr. 21, 1999

Related U.S. Application Data

(60) Provisional application No. 60/082,529, filed on Apr. 21, 1998.

(51) Int. Cl.[7] .................................................. C11B 03/16
(52) U.S. Cl. ......................... 210/767; 210/805; 210/806; 426/417
(58) Field of Search .............................. 210/85, 86, 167, 210/175, 181, 194, 195.1, 257.1, 260, 265, 416.1, 416.5, DIG. 8, 767, 805, 806; 99/408, 330; 426/417

(56) References Cited

U.S. PATENT DOCUMENTS

| 3,701,313 | 10/1972 | Boggs . |
| 3,968,741 | * 7/1976 | Hunt . |
| 4,502,373 | 3/1985 | Keating . |
| 4,702,827 | 10/1987 | Wenzel . |
| 4,890,548 | 1/1990 | Grob et al. . |
| 4,899,649 | 2/1990 | Grob et al. . |
| 4,945,893 | 8/1990 | Manchester . |
| 4,962,698 | * 10/1990 | Drijftholt et al. . |
| 4,974,501 | 12/1990 | Grob et al. . |
| 5,160,444 | * 11/1992 | McFarland . |
| 5,249,511 | * 10/1993 | Shumate et al. . |
| 5,263,406 | * 11/1993 | Chiu . |
| 5,597,601 | * 1/1997 | Griffin . |
| 5,617,777 | * 4/1997 | Davis et al. . |

* cited by examiner

Primary Examiner—Joseph W. Drodge
Assistant Examiner—Terry K. Cecil
(74) Attorney, Agent, or Firm—Baker Botts L.L.P.

(57) ABSTRACT

A method for filtering suspended materials from a cooking substance, e.g. oil or shortening, in a central filtration system 100. The method including the steps of (i) receiving the cooking substance in a first tank 106 from a deep fryer and filtering in a first filtration stage through a separator 112 and returning to the first tank 106; (ii) transitioning to a second stage by filling a second tank 118; (iii) filtering in a second filtration stage through filters 120 and 112; and (iv) holding the cooking substance in a heated tank 126 before returning to the deep fryer. Each stage commences when a certain condition is met, e.g. a predetermine level or weight of cooking substance in a tank or a predetermined clarity of the cooking substance.

14 Claims, 4 Drawing Sheets

METHOD FOR FILTERING SUSPENDED MATERIALS FROM COOKING SUBSTANCES

This application incorporates by reference and claims the benefit of priority of Provisional Application No.60/082,529 filed Apr. 21, 1998 in its entirety.

BACKGROUND OF THE INVENTION

1. Field of the Invention

This invention is directed generally to apparatus and methods for filtration of a cooking substance in a cooking systems, such as a deep fat fryer, and more specifically to a central filtration system and method.

2. Description of Related Art

Large capacity pressurized deep fat fryer cookers (referred herein as deep fat fryers, cooking devices, cookers, and the like) have been devised for cooking products in a heated and or pressurized environment. Typically such devices comprise a cooking vessel, which may be filled with a type of cooking substance (e.g., oil or shortening) and heating devices surrounding or immersed in the vessel for heating the cooking oil. Products to be cooked are placed in the vessel, either directly or possibly contained in a wire basket, and are cooked for a desired length of time.

While such cooking devices described above provide for a relatively effective cooking environment, a problem exists with these devices. Specifically, the cooking substance used in these cooking devices looses some of its effectiveness as it becomes contaminated with suspended particles of food, or "cracklings." This can result in, inter alia, decreased heat capacity for the cooking substance, incomplete cooking, unappealing appearance of the cooked food, and an unappealing taste.

Generally, "cracklings" are pieces of breading, skin, or other items which have separated from a food item being cooked in the fryer. For example, if fried chicken pieces are being cooked within the vessel, some of the breading applied before cooking the chicken may break away from the chicken and drift to the lower zones of the vessel. In the lower portions of the cooking vessel, the cracklings are less likely to cause degradation of the cooking substance in contact with the food products. Because moisture may be found within the cracklings, such moisture may cause the cooking substance to boil over if the cracklings become mixed with the hot oil in the upper zones of the vessel. Further, if the temperature in the bottom of the cooking vessel is too high, the cracklings may burn, causing oxidation of the cooking substance. Such oxidation reduces the useful life of the cooking substance.

Filtration of the cooking substance is a large task. Some fryers include an internal cooking substance filtration system to remove cracklings and other undesirable solids from the cooking substance. The cooking substance from the fryer is drained into a filtration system, where the cracklings are filtered and the cooking substance is cleaned. However, fryers having internal filtration systems tend to be expensive, and the filtration systems often require a significant amount of maintenance.

SUMMARY OF THE INVENTION

It is an object of the invention to provide a system and method for a centralized filtration that overcomes these and other disadvantages.

A system for filtering a suspended material from a cooking substance is disclosed. The system includes a first pump for pumping a cooking substance from at least one fryer, a first tank for receiving the cooking substance from the first pump; a second pump for circulating the cooking substance; a separator for separating the suspended material from the cooking substance, the separator in communication with the second pump; a second tank for receiving the cooking substance; a holding tank for receiving the cooking substance; and a third pump for pumping the cooking substance to at least one fryer. In one embodiment, the separator may be a cyclone separator.

A method for filtering a suspended material from a cooking substance is disclosed. First, a cooking substance from at least one fryer is received. Next, a suspended material from the cooking substance is separated during a first filtration stage. At the completion of the first filtration stage, a transition is made to a second filtration stage. During the second filtration stage, suspended material is separated from the cooking substance. At the completion of the second filtration stage, the cooking substance is held, and then moved to at least one fryer.

A technical advantage of the present invention is that a system and method for centralized filtration is disclosed. Another technical advantage of the present invention is that a cooking substance from at least one fryer may be centrally filtered. Another technical advantage is that the cooking substance is filtered in two filtration stages. Another technical advantage is that a heated holding tank is provided.

However, other objects, features, and advantages will be understood from the following detailed description of preferred embodiments of the invention, in connection with accompanying drawings.

DETAILED DESCRIPTION OF PREFERRED EMBODIMENTS

Figure 1:
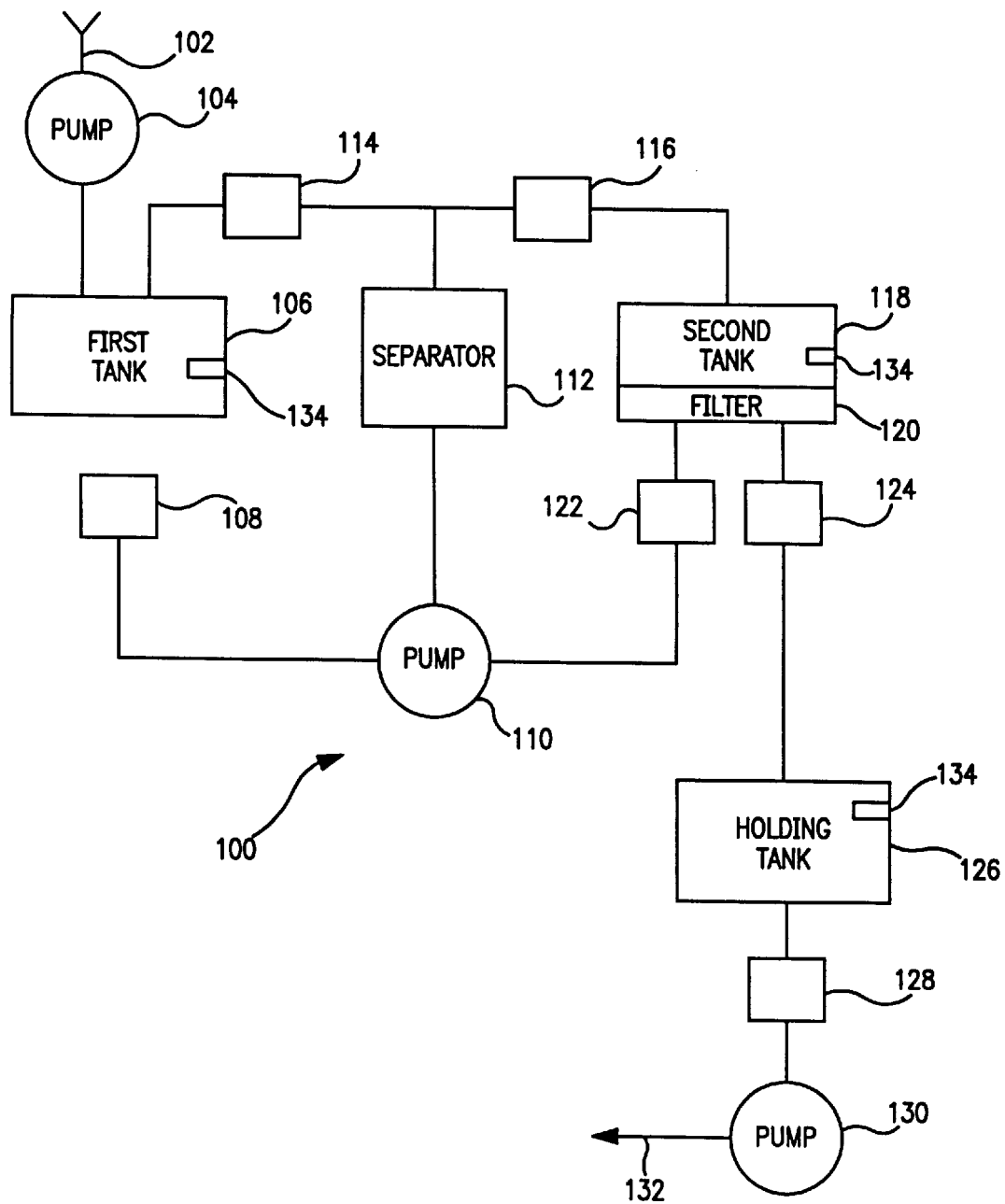
FIG. 1 depicts a schematic of the filtration system according to one embodiment of the present invention.

FIG. 1 depicts a depicts a schematic of the filtration system according to one embodiment of the present invention. It will be understood by one of ordinary skill in the art that the present invention, which will be described below, may be readily implemented with various other fryer types and configurations and that the specific fryers in these figures are shown merely as a preferred embodiment and for illustration purposes.

Referring to FIG. 1, filtration system is provided. Filtration system 100 includes supply line 102, which is provided to connect with at least one deep fat fryer. This line may be connected to drain valves on at least one deep fat fryer, or it may be a connection which is submerged into a deep fat fryer to drain the cooking substance. Supply line 102 is connected to pump 104, which is used to fill tank 106. Any suitable pump may be used. In one embodiment, pump 104 may be a roller pump, such as a series 0500 roller pump, manufactured by Hypro, Inc., of New Brighton, Minn.

Because the cooking substance being pumped by pump 104 may contain a significant amount of crackling, other types of pumps may be used. These pumps may be pumps that crush the crackling and other suspended material, and then pumps the cooking substance with crushed crackling.

First tank 106 and second tank 118 are used to temporarily hold the cooking substance during the first and second filtration stages. These tanks may be standard tanks. In one embodiment, first tank 106 and second tank 118 are made of stainless steel and, the exception of at least one supply line and at least one exit line, may be otherwise sealed. First tank 106 and second tank 118 may have any suitable capacity; in one embodiment, they have a 20 gallon capacity.

First tank 106 and second tank 118 may include at least one sensor (not shown). In one embodiment, several sensors are provided. These sensors may be used to determine information about the cooking substance in the tanks, such as, inter alia, the weight of the cooking substance, the clarity of the cooking substance, the temperature of the cooking substance, the level of the cooking substance in the tanks, and the type of cooking substance present in the tank. This information may be used to determine the completion of the filtration stages, which will be discussed in detail below. In another embodiment, the information may be sent to a controller (not shown) for processing.

Second tank 118 may include filter 120. Filter 120 may include at least one screen (not shown) covered with a paper medium (not shown) for filtering the cooking substance passing through filter 120. Powdered diatomaceous earth (not shown) may also be used in conjunction with the paper medium (not shown) and at least one screen (not shown) to aid in filtering the cooking substance.

Valves 108, 114, 116, 122, 124, and 128 control the flow of the cooking substance throughout filtration system 100. Any suitable valve which is made of a material acceptable for use with a cooking substance may be used. In one embodiment, valves 108, 114, 116, 122, 124, and 128 may be 2-way direct series 8267 solenoid valves, manufactured by Automatic Switch Company, of Florham Park, N.J. Before they are used with the cooking substance, these valves may be nickel-plated. Valves 108, 114, 116, 122, 124, and 128 may be controlled by a controller (not shown), or they may be individually controlled.

Valves 108, 114, 116, 122, 124, and 128 control the flow at different locations within filtration system 100. Valve 108 controls the flow of cooking substance from first tank 106, valves 114 and 116 control the flow of cooking substance to either first tank 106 or second tank 118, valves 122 and 124 control the flow of cooking substance from second tank 118, and valve 128 controls the flow of cooking substance from holding tank 126.

Pump 110 circulates the cooking substance through filtration system 100. Any suitable pump may be used. In one embodiment, pump 110 may be a roller pump, as a series 0500 roller pump, manufactured by Hypro, Inc., of New Brighton, Minn.

Separator 112 is used to separate crackling and other suspended material from the cooking substance. In one embodiment, separator 112 may be a DorrClone CA-25Cyclone Separator, manufactured by Dorr-Oliver Inc. of Milford, Conn.

Separator 112 separates crackling and other suspended materials from the cooking substance, and the cracking and other suspended materials are separated from the cooking substance, and are collected in a collector tank (not shown).

Holding tank 126 may be constructed similarly to first tank 106 and second tank 118. In one embodiment, holding tank 126 may be heated.

Holding tank 126 may be larger than first tank 106 and second tank 118. In one embodiment, holding tank 126 may have the capacity to hold filtered cooking substance from several fryers. Once filtered, the cooking substance may remain in holding tank 106 until it is transferred to a fryer. In one embodiment, at least one sensor 134 may be provided in first tank 106, second tank 118, and or holding tank 126. Sensor 134 may be a level sensor, a liquid-type determining sensor, a temperature sensor, or a combination of these types.

Figure 2:
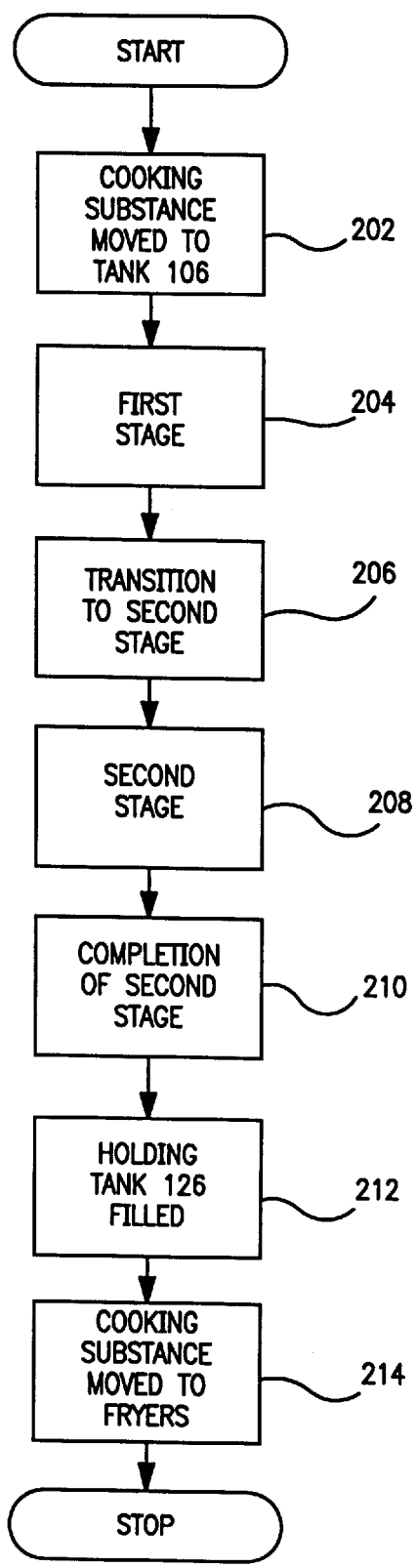
FIG. 2 is a flowchart depicting the filtrating process according to one embodiment of the present invention.

The system operates as follows. Referring to FIG. 2, a flowchart depicting the central filtration method is provided. In step 202, cooking substance containing crackling and other material is transferred from at least one fryer through supply line 102 into first tank 106. This may be accomplished by pump 104. In this step, valve 108 is closed, which causes first tank 106 to fill with the cooking substance. The other valves may also be closed.

In step 204, once a predetermined condition is achieved, the first filtration stage is commenced. The first filtration stage may be commenced when a specific condition is met. This may be when the level of the cooking substance in first tank 106 reaches a predetermined level. This may be determined by an optical sensor, or by some other means. Other conditions, such as the weight of the cooking substance in first tank 106, may also be used to commence the first filtration stage.

To commence the first filtration stage, valves 108 and 114 are opened, while valves 116 and 122 are closed. Pump 110 is activated, and the cooking substance is circulated through valve 108, pump 110, separator 112, valve 114, and back to first tank 106.

Separator 112 separates the crackling and other material from the cooking substance, effectively filtering the cooking substance. The first filtration stage lasts until predetermined condition is met. This condition may be the amount of time that the cooking substance has been circulating. In one embodiment, the first filtration stage lasts for five minutes. Other conditions may also be used to determine when the first filtration stage is complete. For instance, the weight of the cooking substance may be used as a criteria. The first filtration stage may continue until the weight of the cooking substance is within a certain percentage of its known weight, without crackling, indicating that a sufficient amount of crackling has been separated from the cooking substance.

The clarity of the cooking substance may also be used to determine if the first filtration stage is complete. If clarity is used as a condition, an optical sensor (not shown) in first tank 106 may be used to determine if the cooking substance has changed a significant amount in clarity, or if it is within a desired percentage of a known clarity, indicating that sufficient crackling has been removed from the cooking substance. Because the cooking substance may darken with age, it may be necessary to calibrate the sensors to compensate for this darkening. For instance, a new cooking substance may be golden in color, while a used cooking substance will be slightly darker, even when it is free of crackling. Therefore, in order to accurately use clarity of the cooking substance as a criteria, it may be desirable to account for the darkening of the cooking substance.

The volume of cooking substance passing through separator 112 may also be used to determine when to end the first filtration stage. A flowmeter (not shown) may be employed between first tank 106 and separator 112 in order to determine the volume of cooking substance that has passed through separator 112. Once a desired volume of cooking substance has passed, indicating a certain number of passes through separator 112 for the cooking substance, the first filtration stage may be determined to be complete.

Once the first filtration stage is complete, in step 206, the system transitions to the second filtration stage. In order to do so, valve 114 is closed and valve 116 is opened, allowing second tank 118 to fill with cooking substance. Pump 110 and separator 112 continue to operate. Valve 108 remains open until first tank 106 is determined to be empty. This may be determined by optical sensors (not shown) or by weight sensors. Once first tank 106 is empty, valve 108 is closed.

In step 208, the second filtration stage is commenced. Valve 122 is opened, allowing the cooking substance to circulate through valve 122, pump 110, separator 112, 116, second tank 118, and filter 120. Separator 112 continues to separate crackling and other suspended material from the cooking substance.

The length of the second filtration stage may be determined in the same way that the length of the first filtration stage is determined, or another method may be used. Once the second filtration stage is completed, in step 210, valve 122 closes and second tank 118 is filled with cooking substance. Once all of the cooking substance is in second tank 118, pump 110 is turned off.

In step 212, valve 124 is opened, and the cooking substance flows through filter 120 and valve 124 to holding tank 126. In one embodiment, holding tank 126 is located below second tank 118 to take advantage of gravity in filling holding tank 126. In one embodiment, holding tank 126 may be heated.

The cooking substance remains in holding tank 126 until it is required to be transferred to a fryer. In step 214, once the cooking substance is required, valve 128 is opened, and pump 130 is turned on. The cooking substance flows through valve 128, and is pumped through line 132 to fill at least one fryer.

Figure 3B:
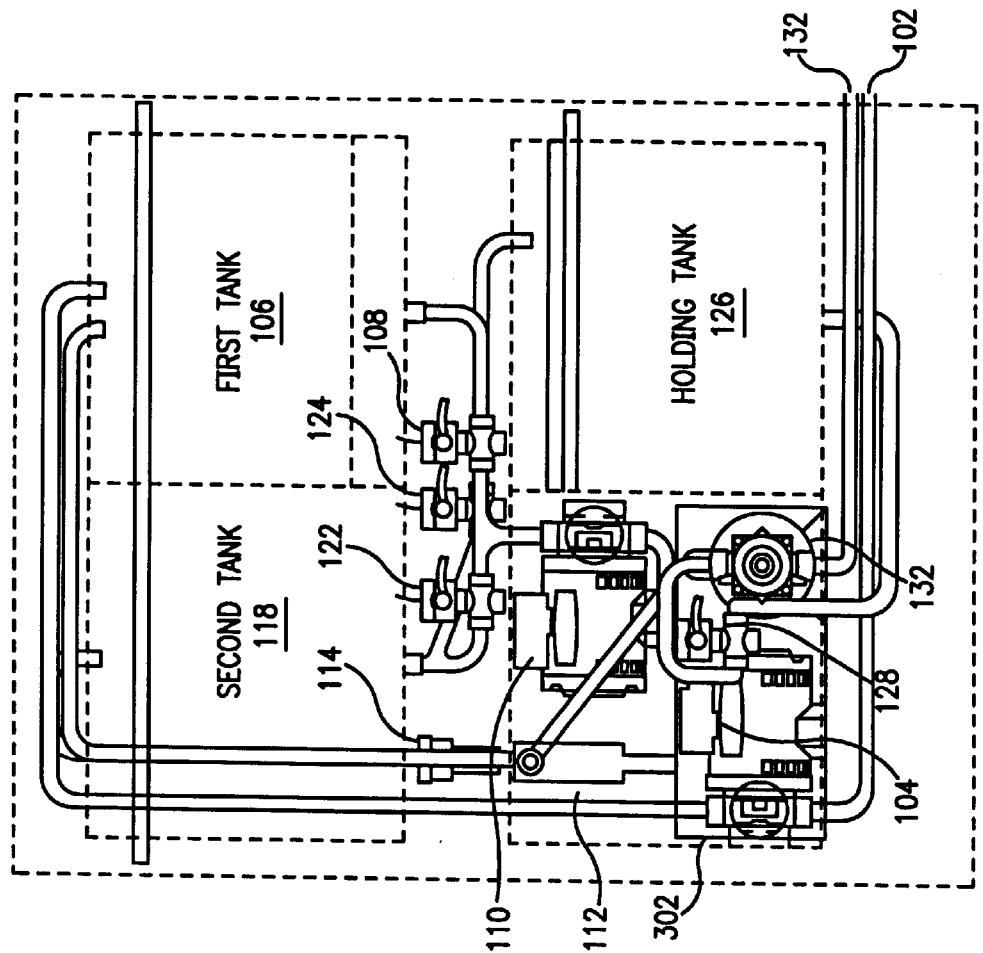
FIG. 3b depicts a side view of a central filtration system in accordance with one embodiment of the present invention.
Figure 3A:
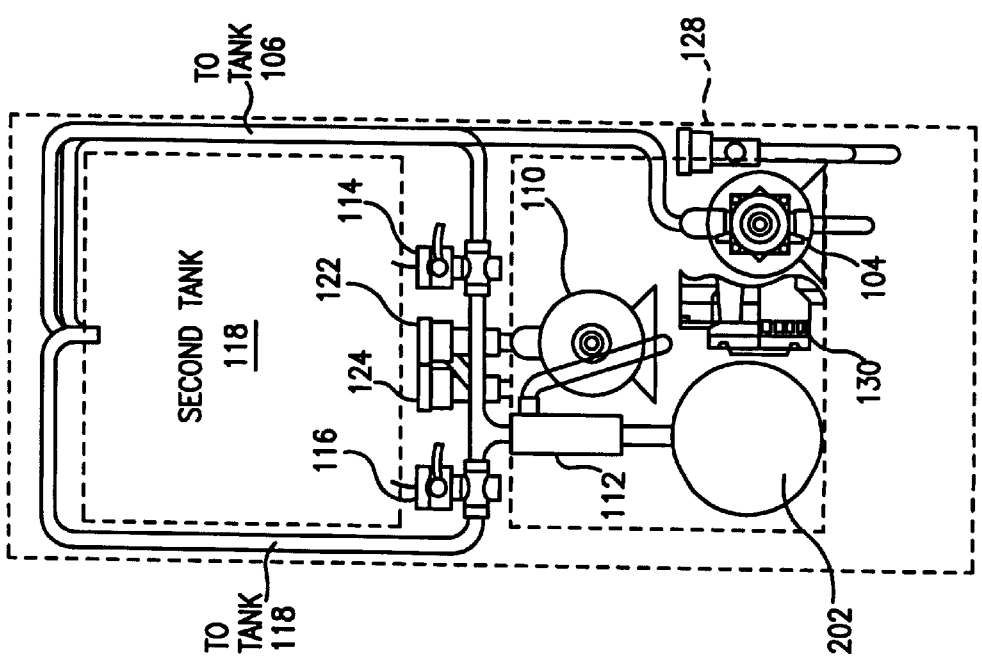
FIG. 3a depicts a front view of a central filtration system in accordance with one embodiment of the present invention.

Referring to FIGS. 3a and 3b, which show a front and side view of a central filteration system according to one embodiment of this invention, a practical layout for the system is shown. Supply line 102 is used to supply cooking substance, and is pumped by pump 104 into first tank 106. Valves 108 and 122 are located below first tank 106 and second tank 118, respectively, to take advantage of gravity while draining these tanks. Separator 112 is shown with separator collection tank 302 positioned beneath it, for receiving crackling and other material. Holding tank 126 is located below second tank, and cooking substance flows due to gravity from second tank 118 to holding tank 126 when valve 124 is opened.

Filtration system 100 may be used as a centralized filtration system for several fryers. Filtration system may be permanently connected to several fryers, and each fryer may have a valve, such as a 2-way direct series 8267 solenoid valve, manufactured by Automatic Switch Company, of Florham Park, N.J. These valves may be controlled by a central controller, which controls when the cooking substance from each fryer is cleaned, and may automatically process it through filtration system 100 and refill the fryer. This may be accomplished without human interaction. The controller may be able to record when the cooking substance in each fryer was last filtered, how many times it has been filtered, the overall quality of the cooking substance, and when the cooking substance should be replaced.

Figure 4:
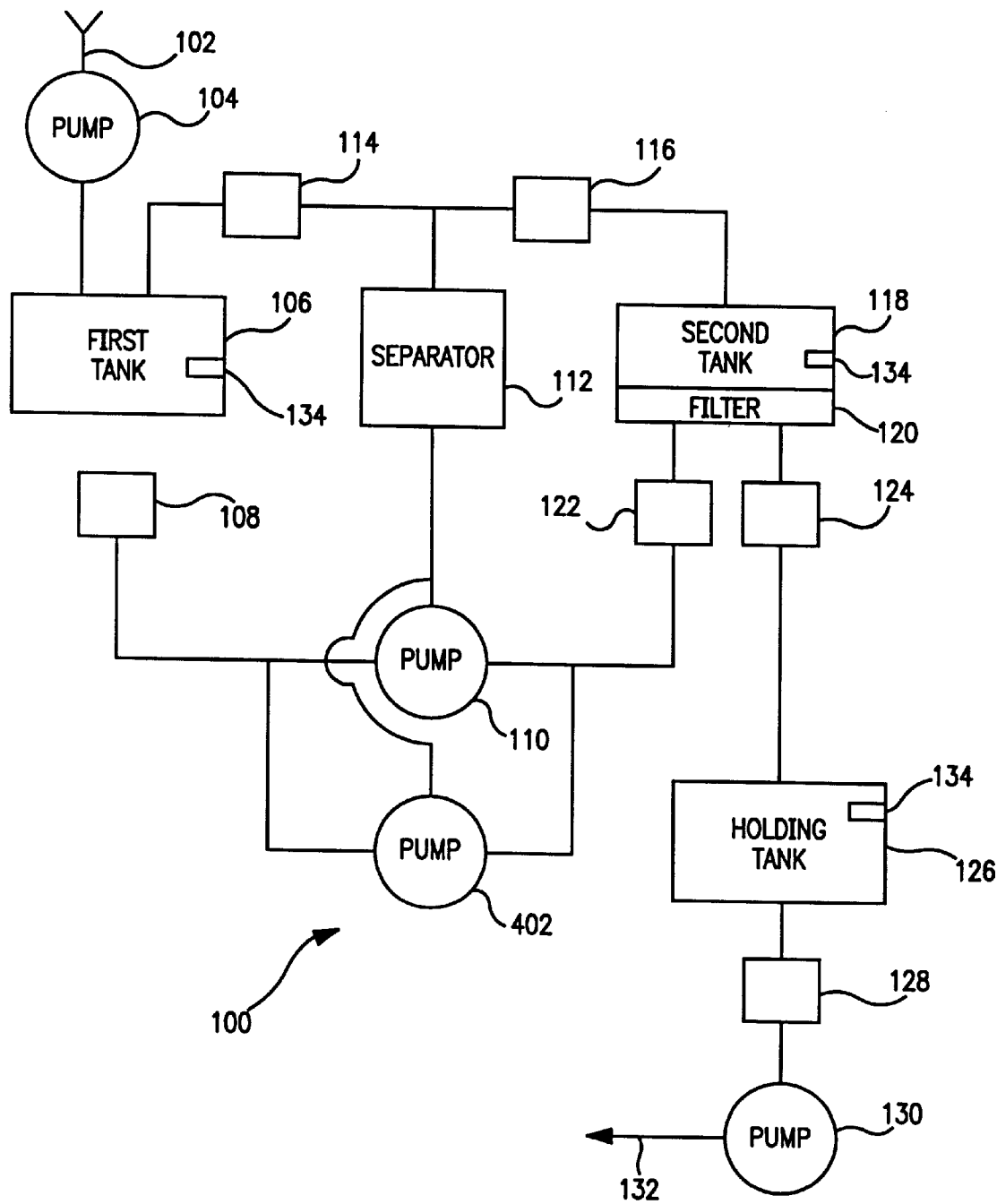
FIG. 4 depicts a schematic of the filtration system according to another embodiment of the present invention.

Filtration system 100 may include several back-up measures to increase reliability, and minimize system downtime. Referring to FIG. 4, back-up pump 402 is provided to serve as a back-up for pump 110. This may be necessary because pump 110 is in use during both the first filtration stage and the second filtration stage, and thus is used more than any element of filtration system 100. Any additional piping to connect back-up pump 402 to filtration system 100, as well as any additional valves (not shown) to select the desired pump may also be provided.

In one embodiment, the use of pump 110 and back-up pump 402 may alternate with each filtration stage. In another embodiment, the use of pump 110 and back-up pump 402 may alternate with each complete first filtration stage and second filtration stage.

In addition to a back-up for pump 110, a back-up valve for each of valves 108, 114, 116, 122, 124, or 128 may also be provided. These valves may be the same type of valve as valves 108, 114, 116, 122, 124, or 128, or they may be different types.

A back-up pump for pump 104 and pump 130 may also be provided. These pumps may be the same type of pump as pumps 104 and 130, respectively, or they may be different types.

The centralized filtration system of the present invention reduces operating cost over fryers that use their own filtration systems. With the filtration system of the present invention, several fryers can be serviced by one filtration system, resulting in a reduction in overall investment, and in maintenance costs, since only one filtration system must be maintained. By providing an automated system, the overall cooking substance quality will be more closely monitored, resulting in more efficient fryers producing a high quality product. Further, by proving a filtration system that is connected to several fryers, the potential for a spill of cooking substance is significantly reduced.

Other embodiments of the invention will be apparent to persons skilled in the relevant art from a consideration of this specification or practice of the invention disclosed herein. It is intended that the specification and examples be considered as exemplary only. Although a detailed description of the present invention is provided above, it is to be understood that the scope of the invention is not limited thereby, but is determined by the claims which follow.

We claim:

1. A method for filtering a suspended material from a cooking substance comprising:
   a. receiving said cooking substance from at least one fryer via a first pump, wherein said cooking substance is transferred to a first tank;
   b. separating a suspended material from said cooking substance in a first filtration stage and returning said cooking substance to said first tank before a completion of said first filtration stage;
   c. transitioning to a second filtration stage, including filling a second tank with said cooking substance;
   d. separating said suspended material from said cooking substance in said second filtration stage; and
   e. completing said second filtration stage.

2. The method for filtering a suspended material from a cooking substance of claim 1, further comprising the steps of:
   holding said cooking substance; and
   moving said cooking substance to said at least one fryer.

3. The method for filtering a suspended material from a cooking substance of claim 2, wherein said step of separating a suspended material from said cooking substance in said first filtration stage comprises:

pumping, said cooking substance from said first tank to a separator;

separating said suspended material from said cooking substance with said separator; and returning said cooking substance to said first tank, wherein said step of pumping said cooking substance from said first tank to a separator comprises:

opening a first valve to allow said cooking substance to flow to a second pump;

openings a second valve to allow said cooking substance to flow from said separator to said first tank;

closing a third valve to prevent said cooking substance from flowing to said second tank; and closing a fourth valve to prevent said cooking substance from flowing to said first tank, wherein said step of holding said cooking substance comprises:

opening a fifth valve to allow said cooking substance to flow into a holding tank;

closing a sixth valve to prevent said cooking substance from flowing to a third pump; and filling said holding tank with said cooking substance.

4. The method for filtering a suspended material from a cooking substance of claim 3, wherein said step of moving said cooking substance to said at least one fryer comprises: opening said sixth valve to allow said cooking substance to flow to said third pump; and pumping said cooking substance to said at least one fryer.

5. The method for filtering a suspended material from a cooking substance of claim 1, wherein said step of separating a suspended material from said cooking substance in said first filtration stage comprises:

pumping said cooking substance from said first tank to a separator;

separating said suspended material from said cooking substance with said separator; and returning said cooking substance to said first tank.

6. The method for filtering a suspended material from a cooking substance of claim 5, wherein said step of pumping said cooking substance from said first tank to a separator comprises:

opening a first valve to allow said cooking substance to flow to a second pump;

opening a second valve to allow said cooking substance to flow from said separator to said first tank;

closing a third valve to prevent said cooking substance from flowing to said second tank; and closing a fourth valve to prevent said cooking substance from flowing to said first tank.

7. The method for filtering a suspended material from a cooking substance of claim 6, wherein said step of separating said suspended material from said cooking substance in said second filtration stage of comprises:

filtering said cooking substance with a filter;

pumping said cooking substance from said second tank to a separator;

separating said suspended material from said cooking substance with said separator; and returning said cooking substance to said second tank.

8. The method for filtering a suspended material from a cooking substance of claim 7, wherein said step of pumping said cooking substance from said second tank to said separator comprises:

closing said first valve to prevent said cooking substance from flowing into said first tank; and opening said fourth valve to allow said cooking substance to flow to said second pump.

9. The method for filtering a suspended material from a cooking substance of claim 6, wherein said step of completing said second filtration stage comprises:

closing said fourth valve to prevent said cooking substance from flowing to said second pump; and filling said second tank with said cooking substance.

10. The method for filtering a suspended material from a cooking substance of claim 1, wherein said first filtration stage commences when a predetermined condition is met, said predetermined condition selected from the group consisting of: when the cooking substance reaches a predetermined level in said first tank; when said cooking substance reaches a predetermined weight in said first tank; and combinations thereof.

11. The method for filtering a suspended material from a cooking substance of claim 1, wherein said step of transitioning to said second filtration stage comprises:

pumping said cooking substance from said first tank to a separator;

separating said suspended material from said cooking substance with said separator; and filling a said second tank with said cooking substance.

12. The method for filtering a suspended material from a cooking substance of claim 1, wherein said step of transitioning to a second filtration stage commences when said first filtration stage meets a predetermined criteria, said predetermined criteria selected from the group consisting of: when a predetermined time has elapsed; when said cooking substance is within a predetermined percentage of a known weight; when said cooking substance is within a predetermined percentage of a known clarity; and combinations thereof.

13. The method for filtering a suspended material from a cooking substance of claim 1, wherein said step of separating said suspended material from said cooking substance in said second filtration stage commences when said first tank is empty and all of said cooking substance is in said second tank.

14. The method for filtering a suspended material from a cooking substance of claim 1, wherein step of completing said second filtration stage commences when said second filtration stage meets a predetermined criteria, said predetermined criteria selected from the group consisting of: when a predetermined time has elapsed; when said cooking substance is within a predetermined percentage of a known weight; when said cooking substance is within a predetermined percentage of a known clarity; and combinations thereof.

* * * * *